(12) United States Patent
Chen et al.

(10) Patent No.: US 7,092,428 B2
(45) Date of Patent: Aug. 15, 2006

(54) SELECTIVE FREQUENCY HOPPING FOR HIT AVOIDANCE IN WIRELESS COMMUNICATIONS SYSTEM AND METHOD

(75) Inventors: Hung-Kun Chen, Hsinchu (TW); Kwang-Cheng Chen, Palo Alto, CA (US)

(73) Assignee: MEDIATEK, Hsinchu (TW)

( * ) Notice: Subject to any disclaimer, the term of this patent is extended or adjusted under 35 U.S.C. 154(b) by 997 days.

(21) Appl. No.: 09/874,510

(22) Filed: Jun. 5, 2001

(65) Prior Publication Data

US 2003/0058923 A1    Mar. 27, 2003

Related U.S. Application Data

(60) Provisional application No. 60/280,055, filed on Mar. 30, 2001.

(51) Int. Cl.
*H04B 1/713* (2006.01)
(52) U.S. Cl. .................................................. 375/132
(58) Field of Classification Search ............... 375/132, 375/133, 135, 136, 346
See application file for complete search history.

(56) References Cited

U.S. PATENT DOCUMENTS

| | | | |
|---|---|---|---|
| 5,809,059 A * | 9/1998 | Souissi et al. ............... | 375/133 |
| 5,937,002 A * | 8/1999 | Andersson et al. ......... | 375/131 |
| 6,298,081 B1 * | 10/2001 | Almgren et al. ............ | 375/132 |
| 6,760,319 B1 * | 7/2004 | Gerten et al. ............... | 370/335 |
| 6,845,123 B1 * | 1/2005 | Nyberg et al. .............. | 375/133 |

OTHER PUBLICATIONS

Hongbing Gan et al., "Adaptive Frequency Hopping, a Non-Collaborative Coexistence Mechanism," IEEE P802.15 Working Group Contribution, IEEE 802.15-00/367rl (Mar. 2001).
Kwang-Cheng Chen et al., "Selective Hopping for Hit Avoidance," IEEE P802.15 Working Group Contribution, IEEE 802.15-01/057r2 (Mar. 2001).
Anuj Batra et al., "An Intelligent Frequency Hopping Scheme for Improved Bluetooth Throughput in an Interference-Limited Environment," IEEE P802.15 Working Group Contribution, IEEE 802.15-01/082rl (Jan. 2001).
Oren Eliezer et al., "Adaptive Frequency Hopping for FHSS Systems," IEEE P802.15 Working Group Contribution, IEEE 802.15-01/169r0 (Mar. 13, 2001).

* cited by examiner

*Primary Examiner*—Betsy L. Deppe
(74) *Attorney, Agent, or Firm*—J.C. Patents (57) ABSTRACT

A selective hopping method for hit avoidance in a frequency hopping spread spectrum communication system utilizing an original hopping sequence, having a plurality of available channels for receiving signal packet traffic utilizing a plurality of receiving signal slots are disclosed. The plurality of available channels all are available for use in frequency hopping. The method includes the steps of dividing the plurality of available channels into a plurality of partitions; distributing the available channels in each of the plurality of partitions into a predetermined distribution; forming a partition sequence by assigning a predetermined number of channels to a plurality of selected receiving signal slot sets; generating a generated hopping sequence by partition mapping, in which the partition mapping is responsive to the partition sequence; and managing the receiving signal packet traffic, in which the receiving signal packet traffic is transmitted only in the selected receiving signal slot sets.

63 Claims, 7 Drawing Sheets

SELECTIVE FREQUENCY HOPPING FOR HIT AVOIDANCE IN WIRELESS COMMUNICATIONS SYSTEM AND METHOD

This application claims priority from U.S. Provisional Application Ser. No. 60/280,055 filed Mar. 30, 2001, entitled "Wireless Communications Selective Hopping for Hit Avoidance System and Method—which is incorporated herein by reference in its entirety.

FIELD OF THE INVENTION

The present invention relates generally to frequency hopping spread spectrum communications and interference avoidance, and more particularly to a selective frequency hopping system and method for hit avoidance.

BACKGROUND OF THE INVENTION

The short-range wireless communication specification in the 2.4 GHz Industrial Scientific Medicine (ISM) band known as "Bluetooth" has been adopted as the basis of the first part of the Wireless Personal Area Network (WPAN) specifications (IEEE Std 802.15.1). Being designed as a low-cost replacement for wires and cables, Bluetooth aims to provide a unified and convenient wireless interface for applications within a "personal area" of approximately 10 meters. Bluetooth utilizes frequency hopping (FH) as its spread spectrum approach, a requirement in the ISM band. The ISM band, however, is an unlicensed shared band that may have interference from many different systems operating concurrently. The Wireless Local Area Network (WLAN) specification known as IEEE Std 802.11(b), and its higher-speed extension, is another wireless communication specification in the ISM band. WLAN is targeted for high-speed data exchange in a local area network (LAN) environment. Clearly, there is a high probability that WPAN and WLAN devices will be utilized at the same time, a situation known as co-existence. The problems arising from co-existence have drawn so much attention that a special task group, TG2, under the auspices of the IEEE 802.15 has been formed to model the resulting performance degradation and study possible solutions. Adaptive frequency hopping (AFH) (HongBing Gan and Bijan Treister, *Adaptive Frequency Hopping Implementation Proposals for IEEE 802.15.1/2 WPAN*, IEEE P802.15 Working Group Contribution, IEEE 802.15-00/367r0, Nov. 1, 2000) has been one proposed solution to the co-existent problem. AFH removes the channels which experience interference from the hopping sequence thus providing hops to the clean, non-interfered channels only. However, one problem with AFH is that the Federal Communications Commission (FCC) has placed a restriction on the channel usage of frequency-hopping systems in the 2.4 GHz band. The system must have at least 75 channels and the occupation time of each channel not exceed 0.4 second in 30 seconds. This implies that at least 75 channels should be kept and used uniformly to achieve full-time usage. Removal of 22 channels occupied by an 802.11b device from the 79 hopping channels of Bluetooth would be unfeasible. This restriction applies to Bluetooth type 1 and type 2 devices but not to type 3 devices due to their relatively lower transmission power (Bluetooth Special Interest Group, *Specifications of the Bluetooth System, vol. 1, v.1.0B 'Core' and vol. 2 v1.0B 'Profiles'*, December 1999). The design of a new hopping sequence is also critical to integrate AFH into Bluetooth. Two recent proposals in the AFH section of TG2 (Hongbing Gan, Bijan Treister, et al, *Adaptive Frequency Hopping, a Non-collaborative Coexistence Mechanism*, IEEE P802.15 Working Group Contribution, IEEE 802.15-00/367r1, March 2001; Kwang-Cheng Chen, Hung-Kun Chen, and Chi-Chao Chao, *Selective Hopping for Hit Avoidance*, IEEE P802.15 Working Group Contribution, IEEE 802.15-01/057r2, March 2001; Anuj Batra, Kofi Anim-Appiah, and Jin-Meng Ho, *An Intelligent Frequency Hopping Scheme for Improved Bluetooth Throughput in an Interference-Limited Environment*, IEEE P802.15 Working Group Contribution, IEEE 802.15-01/082r1, March 2001; and Oren Eliezer and Dan Michael, *Adaptive Frequency Hopping for FHS S Systems*, IEEE P802.15 Working Group Contribution, IEEE 802.15-01/169r0, March 2001) to solve this problem are by Gan and Eliezer, respectively. However, Gan and Eliezer's schemes do not comply with the FCC regulation of using at least 75 hopping channels. Gan's number of channels in the new hopping sequence is equal to that of the good channels, which is adaptive according to the environment. The bad channels in the original hopping sequence are redirected to the pool of good channels in a circular order, while the good channels remain unchanged. This circular order redirection, however, does not maintain the pseudo-randomness of the original hopping sequence and is thus considered a weakness. Eliezer's number of channels in the new hopping sequence is equal to a prime number, 23, selected from the pool of good channels. The sequence has a very short period and also provides no pseudo-randomness. The reduction of the number of hopping channels and shortened period of the hopping sequence is claimed by Eliezer to be suitable for AFH. Another approach to the co-existence problem is so-called intelligent frequency hopping (IFH) (Anuj Batra, Kofi Anim-Appiah, and Jin-Meng Ho, *An Intelligent Frequency Hopping Scheme for Improved Bluetooth Throughput in an Interference-Limited Environment*, IEEE P802.15 Working Group Contribution, IEEE 802.15-01/082r1, March 2001) which uses all the hopping channels and generates a new hopping sequence based on traffic requirements. In IFH, the number of channels used in the new hopping sequence can be equal to the number of all the channels. The new hopping sequence comprises good windows and bad windows. Each good window is followed by a bad window and vice-versa. The length of good windows and bad windows are fixed and optimized for data or voice traffic. IFH generates good channels within the good windows utilizing a look-ahead algorithm; however, the repetition of good and bad channels is not well suited to voice traffic. Furthermore, the look-ahead algorithm requires searching through the sequence and is more complex than other hop-by-hop mapping algorithms, such as in Gan.

SUMMARY OF THE INVENTION

Accordingly, there is needed a selective hopping method for hit avoidance and the system therefor, which may effectively utilize the available channels in the communications system. The present invention is a selective hopping method for hit avoidance in a frequency hopping spread spectrum communication system utilizing an original hopping sequence, having a plurality of available channels for receiving signal packet traffic utilizing a plurality of receiving signal slots are disclosed. The plurality of available channels all are available for use in frequency hopping. The method comprises the steps of dividing the plurality of available channels into a plurality of partitions; distributing the available channels in each of said plurality of partitions into a predetermined distribution; forming a partition sequence by assigning a predetermined number of channels to a plurality of selected receiving signal slot sets; generating a generated hopping sequence by partition mapping from the original hopping sequence, wherein said partition mapping is responsive to said partition sequence; and managing the receiving signal packet traffic, whereby the receiving signal packet traffic is transmitted only in said selected receiving signal slot sets.

The various objects and advantages of the present invention will be more readily understood from the following detailed description when read in conjunction with the appended drawings.

DETAILED DESCRIPTION OF THE INVENTION

The present invention described herein can be used in all frequency hopping spread sectrum (FHSS) communications systems. FHSS communication systems should be interpreted herein and hereinbelow to comprehend all spread spectrum communications systems adopting frequency hopping technology, including frequency hopping spread spectrum multiple access (FHSSMA) communication systems. For simplicity, the present invention is described mainly in terms of Bluetooth® technology. However, such descriptions should be interpreted to be demonstrative, not restrictive.

Selective hopping for hit avoidance (SHHA) (Kwang-Cheng Chen, Hung-Kun Chen, and Chi-Chao Chao, *Selective Hopping for Hit Avoidance*, IEEE P802.15 Working Group Contribution, IEEE 802.15-01/057r2, March 2001), provides that the number of channels used in a new hopping sequence can be equal to the total number of all channels. The channels are divided into partitions according to frequency overlap with interference. One partition sequence from a small set is selected according to a uniform channel utilization requirement, a traffic requirement, and the result of an interference identification. The new hopping sequence is generated by partition mapping from the original hopping sequence, and the selected partition sequence controls which partition to map. The possibility that SHHA may waste some good channels in a bad partition (since the algorithm treats all channels in the partition as bad) is solved in the present invention. SHHA may be less flexible when used for different types of interference (which may have different center frequencies and bandwidths), but the present invention provides for greater flexibility in channel partitioning. The present invention also advantageously incorporates the pseudo-randomness provided by the original Bluetooth hopping sequence.

SHHA Partitioning. The SHHA partitioning method utilizing the channel plan of 802.11b is shown in Table 1 with the three non-overlapped channels in North America and their corresponding Bluetooth hopping channels. Based on Table 3, the 79 Bluetooth hopping channels are then equally divided into three partitions, as shown in Table 2. Note that the Bluetooth channel 78 is not included in any of the three partitions, therefore each partition contains exactly the same number of channels.

TABLE 1

SHHA partitioning method utilizing the 802.11b channel plan

| 802.11b Channel number | Central frequency (MHz) | Range (MHz) | Corresponding Bluetooth channel number |
| --- | --- | --- | --- |
| 1 | 2412 | 2400–2424 | 0–22 |
| 6 | 2437 | 2425–2449 | 23–47 |
| 11 | 2462 | 2450–2474 | 48–72 |

TABLE 2 the 79 Bluetooth hopping channels equally divided into three partitions

| Partition number | Corresponding Bluetooth channel number | Total channels in this partition | Corresponding 802.11b Channel number |
| --- | --- | --- | --- |
| 1 | 0–22, 75–77 | 26 | 1 |
| 2 | 23–47, 74 | 26 | 6 |
| 3 | 48–72, 73 | 26 | 11 |

However, the effective bandwidth of a real 802.11b signal may only occupy 17 to 22 MHz depending on implementation. Clearly, there are still some good channels in a partition with 802.11b interference. Since conventional partition methods treat all channels in a partition as a whole, these good channels are wasted. Assuming that a real 802.11b signal only occupies 17 MHz, a new partitioning and its corresponding channels according to the present invention are shown in Table 3.

TABLE 3

New partitioning and its corresponding channels

| Partition number | Corresponding Bluetooth channel number | Total channels in this partition | Corresponding 802.11b Channel number |
| --- | --- | --- | --- |
| 1 | 2–18 | 17 | 1 |
| 2 | 27–43 | 17 | 6 |
| 3 | 52–68 | 17 | 11 |
| 4 | 0, 1, 19–26, 44–51, 69–78 | 28 | None |

The present invention creates a fourth partition for these good channels. Note that the size of each partition can vary significantly, therefore for a general case, there is the problem of variable and unequal size partitions. To deal with this situation, two more modifications are made in the present invention. The SHHA system incorporates a small set of partition sequences which are designed and stored in a table, then one partition sequence is selected from this set. Since it is not possible to design such a small set which incorporates the many possibilities in the general case, the present invention first utilizes an algorithm for partition sequence generation. Secondly, the partition mapping is modified for unequal partition sizes.

Figure 1:
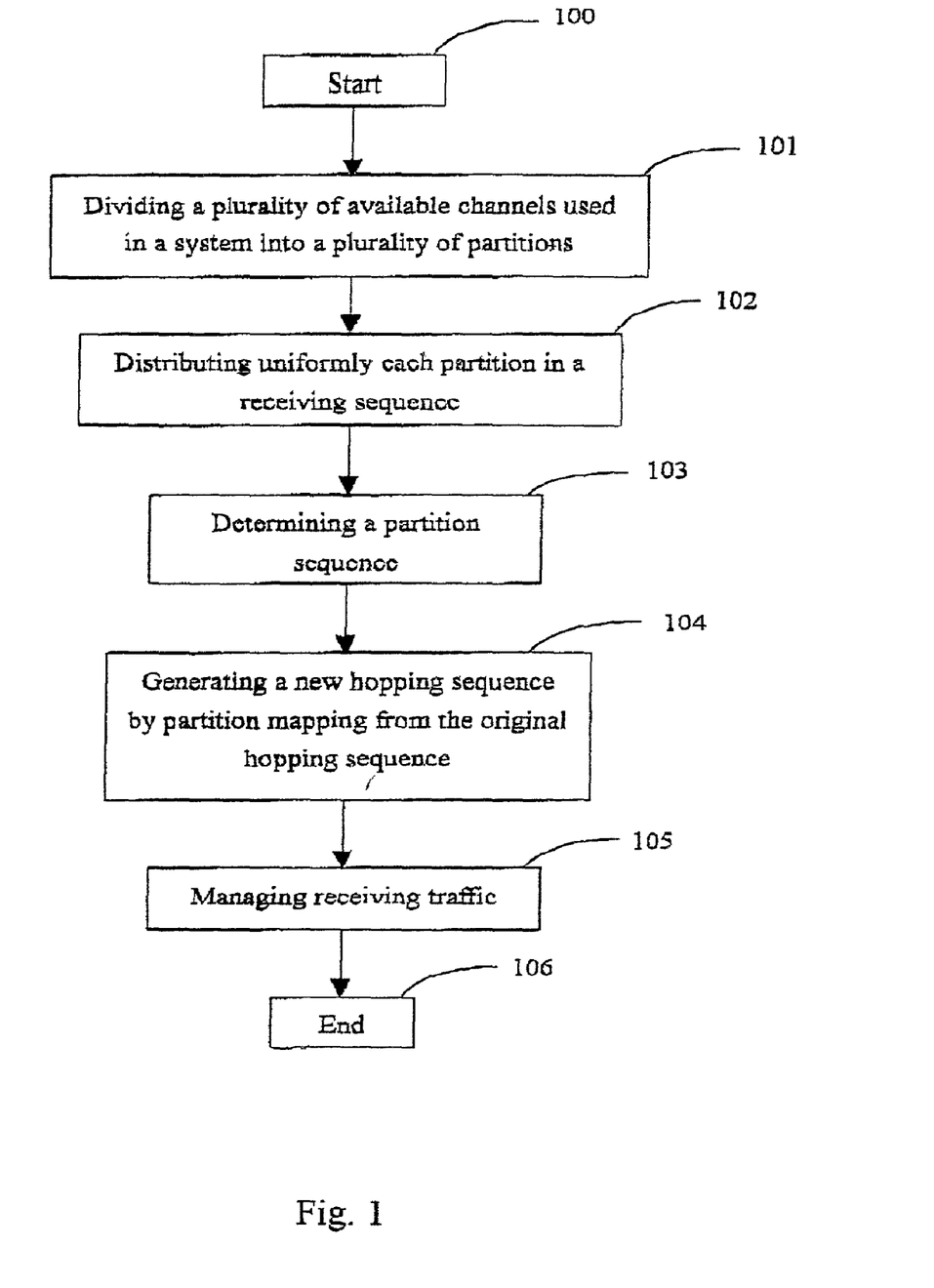
FIG. 1 is a block diagram of one embodiment of the method of the present invention.

The method of the present invention mainly comprises the following steps with reference to FIG. 1. After initiation in step 100, in step 101, a plurality of used channels is divided into a plurality of partitions utilizing an interference collision ratio defined by the number of measured interference divided by the number all received signals for each channel followed by a grouping of channels having similar values of interference collision ratio into the same partition. In step 102, each partition is distributed uniformly in receiving sequence. Then, in step 103, a partition sequence is determined with channels being assigned having lower interference collision ratios to receiving slot sets having desired signal according to priorities of said receiving slot sets. Then, in step 104, a new hopping sequence is generated by partition mapping from the original hopping sequence, wherein the partition sequence controls which partition to map. In step 105 the receiving traffic is managed.

Frame and Superframe. Following the requirements of the algorithm of the present invention and certain communication signal properties, a sequence of signals is divided into superframes, frames, and minimal allocation units (MAU) as illustrated in FIG. 1. Minimal allocation unit (MAU) is defined according to the present invention as a set of signals which have the same importance (i.e., priority) to the receiving end. A frame is a collection of MAUs, in general, a frame being a communicational-identified unit (such as a signal package) which is repeatable in the transmitting and receiving systems. Finally, a superframe is a collection of frames; however, a superframe is not necessarily a communicational-identified unit. Further, after the signals of a superframe have been transferred, all the hop frequencies must be used, and thus the number of signals in the superframe must be a multiple of the allowable frequencies (for example, in a Bluetooth system, the number of signals in a superframe is a multiple of 79, such as 79, 158, 237, etc.).

The method according to the present invention is based on two hypotheses: (1) Each hop frequency allowable must be used equally; i.e., each frequency has the same probability of occurring during the long time period of signal transmission. Namely, the occurrence probability of each partition is positively proportional to the ratio of the channel numbers of the partition to the total channel number. However, this is based on the assumption that all the channel resources can be sufficiently used. (2) The good channels are distributed to MAU with a higher priority. The following embodiment is based on signal transmission structure.

Figure 2:
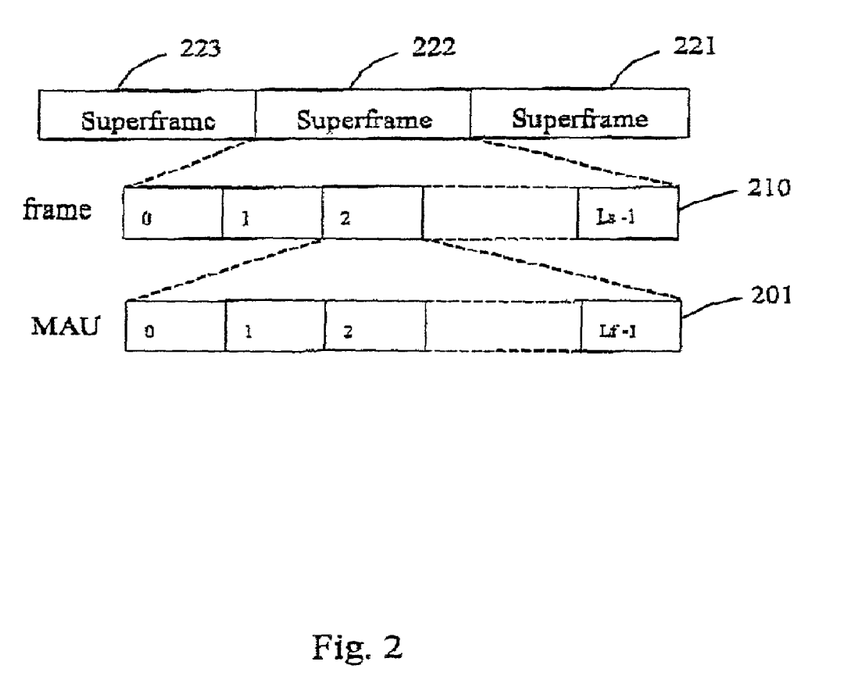
FIG. 2 shows the structure of the partition sequence which containing superframes, frames and MAU according to the present invention.

Under the aforesaid frame structure and the two hypotheses, an embodiment of the algorithm of the present invention is further described as follows: First, the partition distribution in each frame is determined. That is, the number of MAUs for each frame which belongs to a certain partition is determined for all frames and all partitions. Secondly, as the distribution is determined, then the MAU with good partitions (partitions with non-interfering or low interfering channels) is assigned to the sections which contain required signals. The scheme for the partition distribution according to the present invention is illustrated in FIG. 2. A unit MAU 201 is in each frame 210. For a specific partition, the MAUs 201 are distributed evenly into exemplary frame 210 which goes into exemplary superframe 222 (with other exemplary superframes 221 and 222 shown). Thus, the partition sequence in terms of frame and superframe is generated.

Each superframe is composed of $L_s$ frames, and each frame is composed of $L_f$ minimal allocation units (MAU), where each MAU is equal to $L_m$ hops. The whole sequence is periodic with each superframe. Each MAU is assigned to a partition according to the partition sequence described above. Assuming there are P partitions, and the size of the $j^{th}$ partition is $N_j$, where j=1 to P, if all channels should have uniform utilization, the relative frequency of each partition in the partition sequence is proportional to its size. The total number of MAUs in a superframe is ($L_f * L_s$). Therefore, the number of MAUs assigned to the $j^{th}$ partition in a superframe is given by $$M_j = L_f \cdot L_s \cdot \frac{N_j}{N}$$

where $$N = \sum_{j=1}^{P} N_j$$

is the number of all channels. The present invention distributes the $M_j$ MAUs evenly into the $L_s$ frames in a superframe. This will make each frame have roughly the same resources of good channels for communication. The partition distribution algorithm according to the present invention is described following:

$B(0)=0$ for $j=1\sim P$ $$M_j = L_f \cdot L_s \cdot \frac{N_j}{N}$$

if $B(j-1) \neq 0$ $$A(j) = \left\lfloor \frac{M_j - [L_s - B(j-1)]}{L_s} \right\rfloor$$

$B(j)=[M_j-[L_s-B(j-1)]] \bmod L_s$ if $B(j) \neq 0$ $m(i,j)=A(j)+d(i,j)+[1-d(i,j-1)] \forall i=0 \sim (L_s-1)$ if $B(j)=0$ $m(i,j)=A(j)+[1-d(i,j-1)] \forall i=0 \sim (L_s-1)$ if $B(j-1)=0$ $$A(j) = \left\lfloor \frac{M_j}{L_s} \right\rfloor$$

$B(j)=[M_j] \bmod L_s$ if $B(j)\neq 0$ $m(i,j)=A(j)+d(i,j) \forall i=0\sim(L_s-1)$ if $B(j)=0$ $m(i,j)=A(j) \ \forall \ i=0\sim(L_s-1)$ The result m(i,j) is the number of MAUs of the $j^{th}$ partition in the $i^{th}$ frame. In the above equation, $d(i,j)\epsilon\{0, 1\}$ is determined by a residue distribution algorithm; that is, typically, each frame does not have the same number of MAUs in a given partition, there being some residual MAUs. B(j) in the equation above is the number of residual MAUs of the $j^{th}$ partition after distribution. The residue distribution algorithm determines whether the $i^{th}$ frame should contain one of the B(j) residue MAUs. The residue distribution algorithm can have many different forms according to the present invention. In the preferred embodiment, the residue of each partition should be uniformly distributed as far as possible, and thus each frame should be distributed with at most one MAU of a partition. Moreover, those frames not being filled with residues have priority to be filled with residue channels. An embodiment of a residue distribution algorithm according to the present invention is illustrated as follows.

$$c(j) = \left\lceil \frac{L_s}{B(j)} \right\rceil$$

for $i=0\sim(L_s-1)$ if $\{i \bmod c(j) = 0\}$ or $\left\{[i \bmod c(j) = 1] \text{ and } \left[\left\lfloor \frac{i}{c(j)} \right\rfloor < B(j) - \left\lceil \frac{L_s}{c(j)} \right\rceil \right]\right\}$ $d(i,j)=1$ else $d(i,j)=0$.

This algorithm is targeted to minimize the spacing between the distribution as "1"s.

These two algorithms according to the present invention can be described more generally as follows: (1) The partition Distribution Algorithm:

Step 1: Calculate the total number of MAUs of this ($j^{th}$) partition.

Step 2: If there was residue MAU distribution at the last (($j-1)^{th}$) partition, assign one MAU of the $j^{th}$ partition to each frame that was not assigned a residue MAU from the last ($j-1)^{th}$ partition.

Step 3: calculate the maximum number of MAUs of the $j^{th}$ partition that each frame can have equally; assign this number of MAUs of the $j^{th}$ partition to each frame.

Step 4: Calculate the number of residual MAUs of the $j^{th}$ partition; if the number is nonzero, assign these residual MAUs evenly across the frames.

(2) The Residue Distribution Algorithm:

Step 1: Calculate the minimum spacing to distribute the residue MAUs.

Step 2: Assign one residual MAU to the frames with equal minimal spacing.

Step 3: For any MAUs left, assign them to the unassigned frames (the unassigned frames can be the ones next to those in step 2).

Traffic Management. After the determination of m(i,j), the number of MAUs of the $j^{th}$ partition in the $i^{th}$ frame, these MAUs are arranged responsive to the signal packets traffic requirement. In each frame, a priority number to each MAU slot is assigned. The priority number 0 represents the highest priority and generally a smaller priority number represents a higher priority. These priority numbers form a priority sequence according to the present invention as follows:

$t(k), k=0\sim L_f-1; \ 0 \leq t(k) \leq (N_t-1)$ where t(k) is the priority of the $k^{th}$ MAU, and $N_t-1$ is the allowance maximum priority. For convenience, the partitions are sorted such that partition 1 has the smallest probability of interference, and the partition with smaller partition number has smaller probability of interference. The algorithm according to the present invention is:

Step 1: Assign a priority to the MAUs of a frame according to the importance of the signals carried by the MAUs.

Step 1: Find the MAU slots with smallest value of t(k) from the unassigned MAU slots.

Step 2: Find a partition with smallest partition number from the remaining partitions.

Step 3: Assign the partition to the MAU slot.

Mathematically, the algorithm is:

j=0 for $x=0\sim N_t-1$, for $k=0\sim L_f-1$,

If $t(k)=x$ while $m(i,j)=0, j=j+1$ $s(i \cdot L_f+k)=j$ $m(i,j)=m(i,j)-1$.

The resulting sequence s(l) defines which partition should be used in the given MAU slot.

Following are some examples to show the operation and parameter selection of the algorithm according to the present invention. These examples are for illustrative purposes only and should not be construed as limiting the invention in any way. First the traffic characteristic should be considered. The Bluetooth SCO traffic combinations are shown in Table 4.

TABLE 4

| Bluetooth SCO traffic combinations | |
|---|---|
| Traffic combinations | Bluetooth traffic parameters |
| 1 | One full-duplex SCO link, Tsco = 4, Dsco = 0, 1 |
| 2 | One full-duplex SCO link, Tsco = 4, Dsco = 2, 3 |
| 3 | One full-duplex SCO link, Tsco = 6, Dsco = 0, 1 |
| 4 | One full-duplex SCO link, Tsco = 6, Dsco = 2, 3 |
| 5 | One full-duplex SCO link, Tsco = 6, Dsco = 4, 5 |
| 6 | Two full-duplex SCO link, Tsco = 6, Dsco = 0, 1, 2, 3 |
| 7 | Two full-duplex SCO link, Tsco = 6, Dsco = 0, 1, 4, 5 |
| 8 | Two full-duplex SCO link, Tsco = 6, Dsco = 2, 3, 4, 5 |

A hop is reserved for the traffic if Hop-clock mod Tsco=Dsco. Traffic combination number 4 is a SCO link with Tsco=6 and Dsco=2,3. Its period is six hops, and it reserves the slot 2 and 3 within each period of six hops. Generally speaking, the frame should match the period of the traffic. In this case, each MAU is chosen to be composed of two hops and each frame is composed of three MAUs. The selection of another parameter $L_s$ should result in integer value of $M_j$ since $$M_j = L_f \cdot L_s \cdot \frac{N_j}{N}.$$

A very simple selection is $L_s=N$.

For the sake of convenient demonstration, it is assumed that the number of used channels is 11. It is also assumed that these channels are divided into two partitions according to their interference collision ratio. Partition 1 is the good partition and contains five channels, while partition 2 is the bad partition and contains six channels. These parameters are summarized in Table 5.

TABLE 5

Partition parameters

| Symbol | Value | Description |
|---|---|---|
| $L_s$ | 11 | Number of frames per superframe |
| $L_f$ | 3 | Number of MAUs per frame |
| $L_m$ | 2 | Number of hops per MAU |
| N | 11 | Number of used channels |
| $N_1$ | 5 | Number of channels in partition 1 (good partition) |
| $N_2$ | 6 | Number of channels in partition 2 (bad partition) |

The partition distribution algorithm operates as follows:

$$M_1 = L_f \cdot L_s \cdot \frac{N_1}{N} = 15,$$

and $M_2=18$. There are 15 MAUs of partition 1 and 18 MAUs of partition 2. The distribution result is illustrated in Tables 6 and 7.

TABLE 6

Partition distribution in various frames

| | | | | | | | | | | | |
|---|---|---|---|---|---|---|---|---|---|---|---|
| | P2 | P2 | P2 | P2 | P2 | P2 | P2 | P2 | P2 | P2 | P2 |
| | P1 | P2 | P2 | P1 | P2 | P2 | P1 | P2 | P2 | P1 | P2 |
| | P1 | P1 | P1 | P1 | P1 | P1 | P1 | P1 | P1 | P1 | P1 |
| Frame | 0 | 1 | 2 | 3 | 4 | 5 | 6 | 7 | 8 | 9 | 10 |

TABLE 7

MAU Distribution

| | i = 0 | 1 | 2 | 3 | 4 | 5 | 6 | 7 | 8 | 9 | 10 |
|---|---|---|---|---|---|---|---|---|---|---|---|
| j = 1 | 2 | 1 | 1 | 2 | 1 | 1 | 2 | 1 | 1 | 2 | 1 |
| j = 2 | 1 | 2 | 2 | 1 | 2 | 2 | 1 | 2 | 2 | 1 | 2 |

The traffic priority sequence is designed to protect the traffic by assigning higher priority, as in Table 8.

TABLE 8

11/22 Traffic priority sequence

| Hop clock % 6 | 0 | 1 | 2 | 3 | 4 | 5 |
|---|---|---|---|---|---|---|
| Reserved hop | | | Reserved | Reserved | | |
| MAU slot | 0 | | 1 | | 2 | |
| Traffic priority sequence | 1 | | 0 | | 1 | |

The resultant partition sequence in a superframe is shown in Table 9.

TABLE 9

Resultant superframe partition sequence

| | Fame 0 | | | Frame 1 | | | Frame 2 | | | Frame 3 | | |
|---|---|---|---|---|---|---|---|---|---|---|---|---|
| s(l) | 1 | 1 | 2 | 2 | 1 | 2 | 2 | 1 | 2 | 1 | 1 | 2 |
| | Frame 4 | | | Frame 5 | | | Frame 6 | | | Frame 7 | | |
| s(l) | 2 | 1 | 2 | 2 | 1 | 2 | 1 | 1 | 2 | 2 | 1 | 2 |
| | Frame 8 | | | Frame 9 | | | Frame 10 | | | | | |
| s(l) | 2 | 1 | 2 | 1 | 1 | 2 | 2 | 1 | 2 | | | |

Each frame contains at least one MAU of partition 1 aligned to the traffic, and some frames have more than one MAUs of partition 1.

Figure 3:
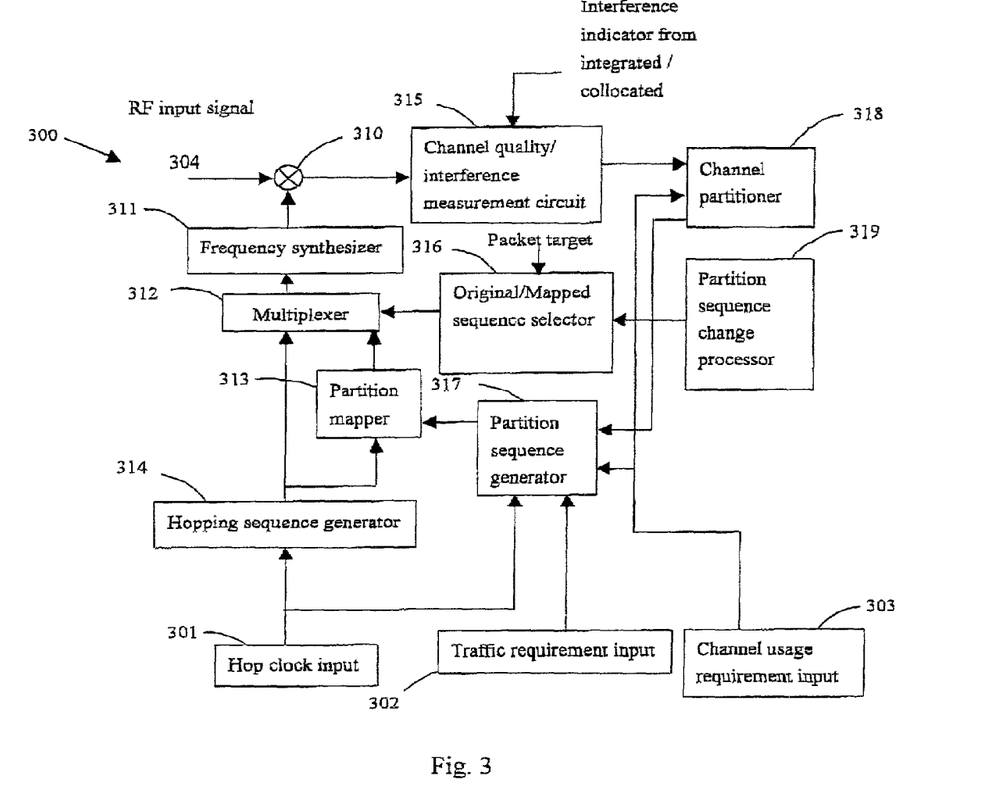
FIG. 3 shows an embodiment of a system architecture according to the present invention.

System Architecture. The system architecture in the preferred embodiment of the present invention is shown in FIG. 3. In system 300 of the present invention, a hopping sequence generator 314 has a hop clock input 301, so as to provide a system clock, and has an output being connected to a multiplexer 312 and a partition mapper 313. A partition sequence change processor 319 provides the process for changing the partition sequence and has an output connected to an original/mapped sequence selector 316. A partition sequence generator 317 has hop clock input 301, traffic requirement input 302, channel usage requirement input 303 and channel partitioner 318, and serves as a generator of a partition sequence. The output of the partition sequence generator 317 is connected to a partition mapper 313. The partition mapper 313 has inputs from the hopping sequence generator 314 and partition sequence generator 317. The partition mapper 313 serves to map the partition sequence into a new hopping sequence. The original/mapped sequence selector 316 serves to select a hopping sequence and then provides the selected result to multiplexer 312. Multiplexer 312 receives the signals from the hopping sequence generator 314, partition mapper 313 and original/mapped sequence selector 316 so as to determine a hop frequency.

In operation, a frequency synthesizer 311 outputs a continuous sinusoidal signal with a frequency being determined by the current channel number from the hopping sequence. In a mixer 310, an RF input signal 304 is mixed with the signal from the frequency synthesizer 311, and the signal in the desired channel is converted to a lower and fixed intermediate frequency (IF). Thus the frequency synthesizer 311 and mixer 310 together perform the function of channel selection. The output of the mixer 310 is inputted to a channel quality/interference level measurement circuit 315 for measuring the channel quality and interference level. Channel partitioner 318 receives the inputs from the channel quality/interference level measurement circuit 315, which serves to divide the channels into various partitions. The present invention divides channels into partitions so that channels in the same partition have similar channel quality or probability of interference. Channel interference measurement is first performed and gives each channel an interference collision ratio, representing its channel quality or probability of interference-caused error. In some cases, some interference indication signal is available from integrated or collocated devices. According to the interference collision ratios, channels are divided into partitions, and the partition with the lower number contains the better channels. Based on the traffic requirement, channel usage requirement, and the result of channel partitioning, a partition sequence is generated to reduce the usage of the interfered channels. After the present invention decides to apply a new partition sequence, it starts to communicate with all of its peers. For those peers that support the feature of partition sequence, it negotiates with them, one peer at a time, to change to the new hopping sequence. For those that have not been changed to the new sequence or that do not support the new sequence, the old sequence is still used for communication. Records are kept for all of its peers. With a packet to transmit, the target address is checked to select between the original and mapped sequence. The hopping sequence generation 314 outputs the original hopping sequence, while the partition mapper 313 maps the channel selected by the original hopping sequence into one channel of the desired partition.

Detailed Description of Embodiments of System 300. The design of the key blocks of FIG. 3 of the present invention are described in detail as follows. Those blocks that are not described herein are known to those in the art.

Channel quality/interference measurement. Channel quality/interference measurement circuit 315 determines the quality of each channel under interference. The measurement performed herein is the collision ratio, which is the probability of collision with an interference signal when the system hops to this channel. In a frequency hopping communication system, the carrier frequency changes to different frequency channels according to its hopping sequence. As the system is using the $k^{th}$ channel, interference detection is possible. The detection gives an indication about an interference event or an interference-free event. It is possible to have another possible output as an unknown event when the system does not have sufficient confidence to make a decision between an interference event and an interference-free event.

There are two embodiments for interference detection according to the present invention. The first scheme checks the received packet and the received power level. Received packets with lower power are more likely to have errors caused from noise, and these packets are indicated as unknown events. Packets with its power level exceeding a threshold are demodulated and checked for errors. The existence of error in a packet can be found by the error detection capability in the received packet, typically, Header Error Check (HEC), Cyclic Redundancy Check (CRC) and Forward Error Correction code (FEC). The packets with errors are indicated as interference events, while packets without errors are indicated as interference-free events. In summary, the channel quality/interference measurement circuit 315 in this embodiment performs as follows: Upon receiving a packet, Step 1: Determine whether the signal power is larger than or less than a threshold.

Step 2: Determine whether the received packet is an unknown event if received signal power is below a threshold.

Step 3: Determine that it is an interference event if received signal power is above a threshold and an error is detected by any of HEC, CRC, or FEC.

Step 4: Determine that it is an interference-free event if received signal power is above a threshold and no error is detected by any of HEC, CRC, or FEC.

Another embodiment of the present invention utilizes the channel silent time between the channel active time. The channel silent time is the interval when there should be no transmission in the system. For example, in the Bluetooth specification, one time slot is 625 microseconds in length, and the channel silent time is 255 microseconds at the end of the slot where a given packet ends. This channel silent time is reserved for the transition of the frequency synthesizer to the next hopping channel. Thus any signal power in the channel silent time is interference. Therefore the signal strength in the channel silent time is measured. The detection indicates an interference event if the signal strength exceeds a threshold, otherwise it indicates an interference-free event. In summary, the channel quality/interference measurement circuit 315 performs in this embodiment as follows:

Step 1: Measure the received signal strength in the channel silent time.

Step 2: Determine that it is an interference event if received signal power is above a predetermined threshold in channel silent time.

Step 3: Determine that it is an interference-free event if received signal power is below a predetermined threshold in channel silent time.

To obtain an interference collision ratio for each channel, the algorithm counts the numbers of interference events and interference-free events for each partition in a given period while it discards other events such as unknown events. Then it calculates the interference collision ratio for each channel as the ratio of the number of interference events to the sum of the number of interference events and the number of interference-free events.

Channel partitioning. The channel partitioner 318 determines the number of partitions and the size and channels of each partition. The channels are grouped with similar values of interference collision ratio into the same partition. However, there are certain constraints. Following are some schemes which constitute different embodiments of the present invention to address the constraints: Algorithm (1), assuming that the number of channels to be used is limited to a set of integers, $\{Z_1, Z_2, \ldots\}$, Step 1: Select the smallest number, $Z_{min}$, from the set.

Step 2: Select $Z=Z_{min}$ channels with lowest value of interference collision ratios.

Step 3: For each channel resulted from step 2, compare its interference collision ratio to a set of predetermined threshold $\{c_1, c_2, \ldots, c_q\}$, and determine the partition that the channel belongs to by the following: Channel k belongs to partition j, if $c_{j-1} \leq r_k < c_j$, where $c_0=0, c_q=\infty$.

Step 4: Remove the partitions with zero channels. Reassign partition numbers to fill the hole of removed partition.

Step 5: Then the total number of partitions, the members and size of each partition can be obtained.

Algorithm (2), assuming that the number of channels to be used is limited to a set of integers, $\{Z_1, Z_2, \ldots\}$, Step 1: Count the number of channels $N_c$ whose interference collision ratios are below a predetermined threshold c.

Step 2: Find a number Z. from the set $\{Z_1, Z_2, \ldots\}$, such that it is the largest and satisfies $Z \leq N_c$. If there is no such number, select $Z = Z_{min}$, the smallest number from the set.

Step 3: Select Z channels with lowest value of interference collision ratios.

Step 4: For each channel resulted from step 2, compare its interference collision ratio to a set of predetermined threshold $\{c_1, c_2, \ldots, c_q\}$, and determine the partition that the channel belongs to by:

Channel k belongs to partition j, if $c_{j-1} \leq r_k < c_j$, where $c_0 = 0, c_q = \infty$ Step 5: Remove the partitions with zero channels; reassign partition numbers to fill the hole of removed partition.

Step 6: Calculate the total number of partitions, and the members and size of each partition.

Partition sequence change processor. After system 300 decides to apply a new partition sequence, communication with all of its peers is begun utilizing partition sequence change processor 319. For those peers that support the feature of partition sequence, partition sequence change processor 319 negotiates with them, one peer at a time, to change to the new hopping sequence. For those that have not been changed to the new sequence or that do not support the new sequence, the old sequence is still used for communication. The master device, partition sequence change processor 319, takes the responsibility to perform the change procedure to all slaves.

Original/Mapped Sequence Selector. Original/mapped sequence selector 316 in the preferred embodiment provides backward compatibility. Original/mapped sequence selector 316 allows slaves with the mapped sequence and original sequence to exist in one pico-net. The original/mapped sequence selector 316 master selects between the original hopping sequence and the partition-mapped sequence based on the target it communicates with. A database directory is maintained by the partition sequence change procedure. One embodiment of the directory is shown in Table 5.

TABLE 5

Example of the directory of partition-mapped sequence

| Partition-mapped sequences is active | Yes | |
|---|---|---|
| Peer address | Capability to support the mapped sequence? | Current sequence used |
| 1 | Yes | Mapped |
| 3 | No | Original |
| 4 | Yes | Mapped |
| 7 | Yes | Original |

Partition sequence generation. The partition sequence generator 317 generates the partition sequence s(l) by the method described above.

Partition mapping, The partition mapper 313 selects one channel from the desired partition. This selection is uniform among all channels in this partition. That is, each channel should have the same probability of selection. However, any discrete statistically or deterministically uniform distribution which maps to all channels in the partition also serves the purpose. The mapping can be either from the original hopping sequence to maintain the desired pseudo-randomness, or from a periodic signal. Another important function of mapping is to retain the similarity between the original sequence and the mapped sequence. This is described below.

Figure 4:
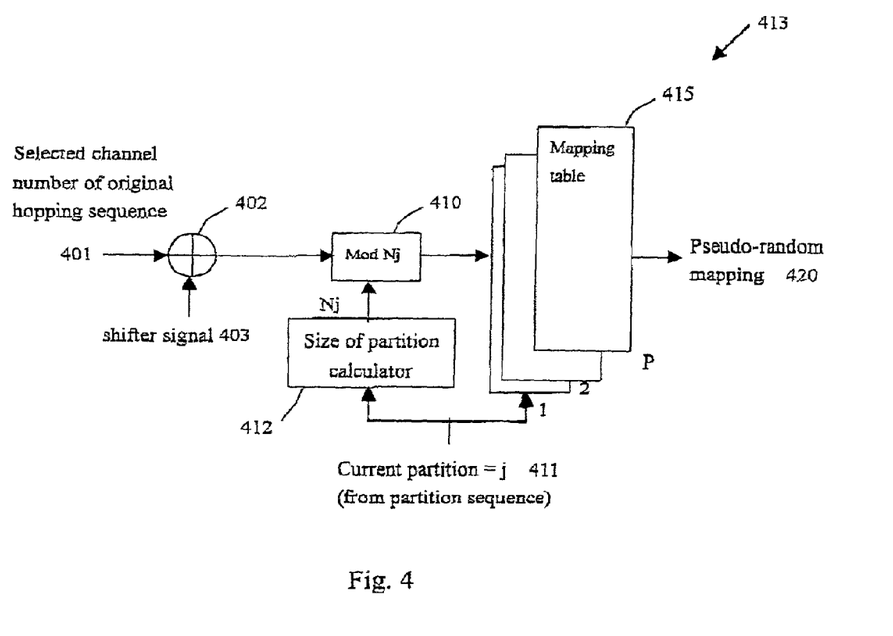
FIG. 4 is a system block diagram showing the channel selection by the original hopping sequence into one channel of the partition according to the present invention.

Pseudo-random mapping. In another embodiment of the present invention, partition mapper 313 maps the selected channel by the original hopping sequence into one channel of the partition. FIG. 4 is a block diagram showing this embodiment of partition mapper 413. The number (0 to N−1) of the selected channel from the original hopping sequence 401 is inputted to a mixer 402 which also receives a shifter signal input 403. The content of each partition table is a list of the channels of this partition. The mixed signal from mixer 402 is inputted to Mod $N_j$ 410. The $j^{th}$ partition from the partition sequence at 411 is inputted to size of partition calculator 412 which in turn inputs $N_j$ (the number of channels of the $j^{th}$ partition). Mod $N_j$ then takes the modulus of $N_j$ and the mixed signal input from mixer 402 to input into mapping table 415 which maps this partition. The average shifter signal over one period equalizes the channel utilization after partition mapping. Shifter signal 403 should be uniformly distributed within $\{0, 1, 2, \ldots (N_j-1)\}$, where $N_j$ is the number of channels of this $j^{th}$ partition. A simple implementation is a set of counters (not shown in FIG. 4), one counter for each partition. The counter of the $j^{th}$ partition counts periodically within $\{0, 1, 2, \ldots (N_j-1)\}$. Only the counter of the selected partition counts to the next value and its content is outputted as the value of the shifter signal 403. Mapping table 415 outputs a pseudo-random mapping at 420.

Figure 5:
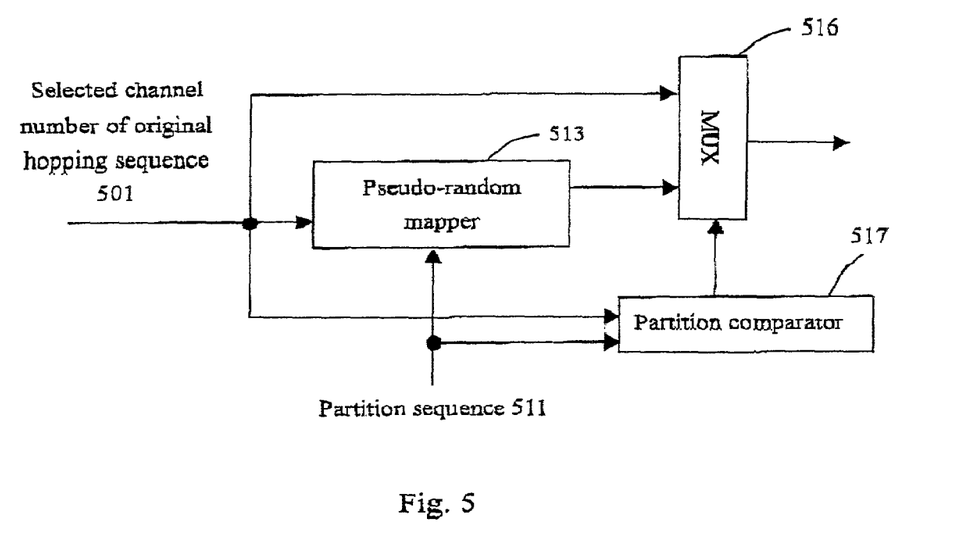
FIG. 5 is a system block diagram showing maintenance of the similarity between the original sequence and mapped sequence according to the present invention.

Bypass for similarity. FIG. 5 is a block diagram showing the similarity bypass scheme of this embodiment of the present invention. The selected channel number (0 to N−1) of original hopping sequence 501 and channel number of the original hopping sequence from pseudo-random mapper 513 (having a partition sequence input 511) are outputted to a multiplexer 516. To maintain the similarity between the original sequence and the mapped sequence, if the channel of the original hopping sequence is already in the desired partition as determined from an input of partition sequence 511 to a partition comparator 517 which inputs to multiplexer 516, then the output of multiplexer 516 will indicate that the channel should remain unchanged at 520.

Figure 6:
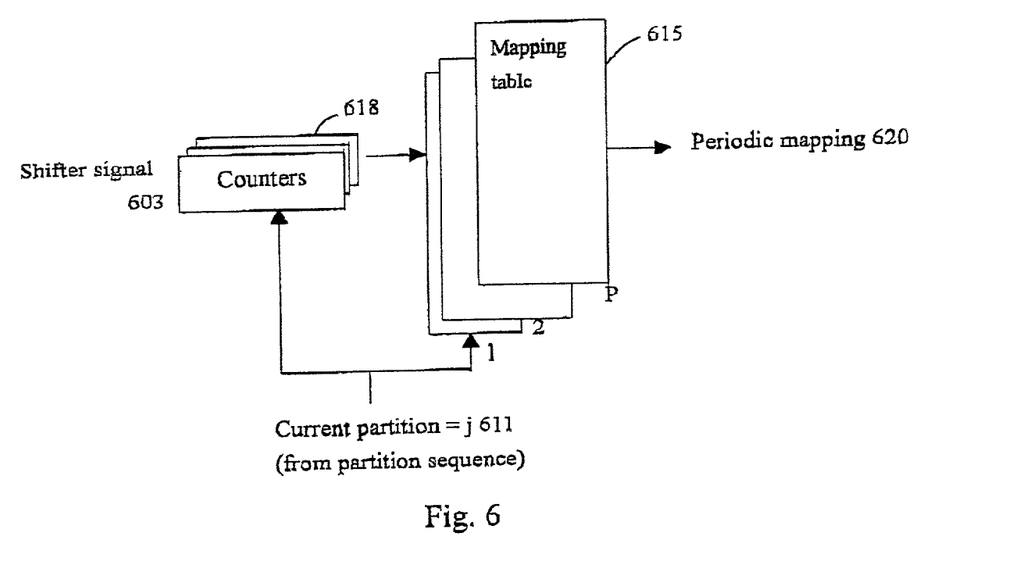
FIG. 6 is a system block diagram showing the periodic mapping utilized in and embodiment of the present invention.

Periodic mapping. FIG. 6 is a block diagram illustrating the periodic mapping embodiment of the present invention. Shifter signal 603 is the same type as that described as shifter signal 403 of FIG. 4. Shifter signal 603 is uniformly distributed within $\{0, 1, 2, \ldots (N_j-1)\}$, where $N_j$ is the number of channels of this $j^{th}$ partition. A simple implementation is a set of counters 618 with counting steps, one counter for each partition. The counter of the $j^{th}$ partition counts periodically within $\{0, 1, 2 \ldots (N_j-1)\}$. For example, the output sequence of the $j^{th}$ counter can be defined as $s_j(k) = [s_j(k-1) + t_j] \mod N_j$, where $t_j$ is the step size. Only the counter of the selected partition is counting to the next value and its content is outputted as the value of the shifter signal. Counters 618 inputs into mapping table 615 together with the current partition j 611 to produce a periodic mapping at 620 according to the present invention.

Figure 7:
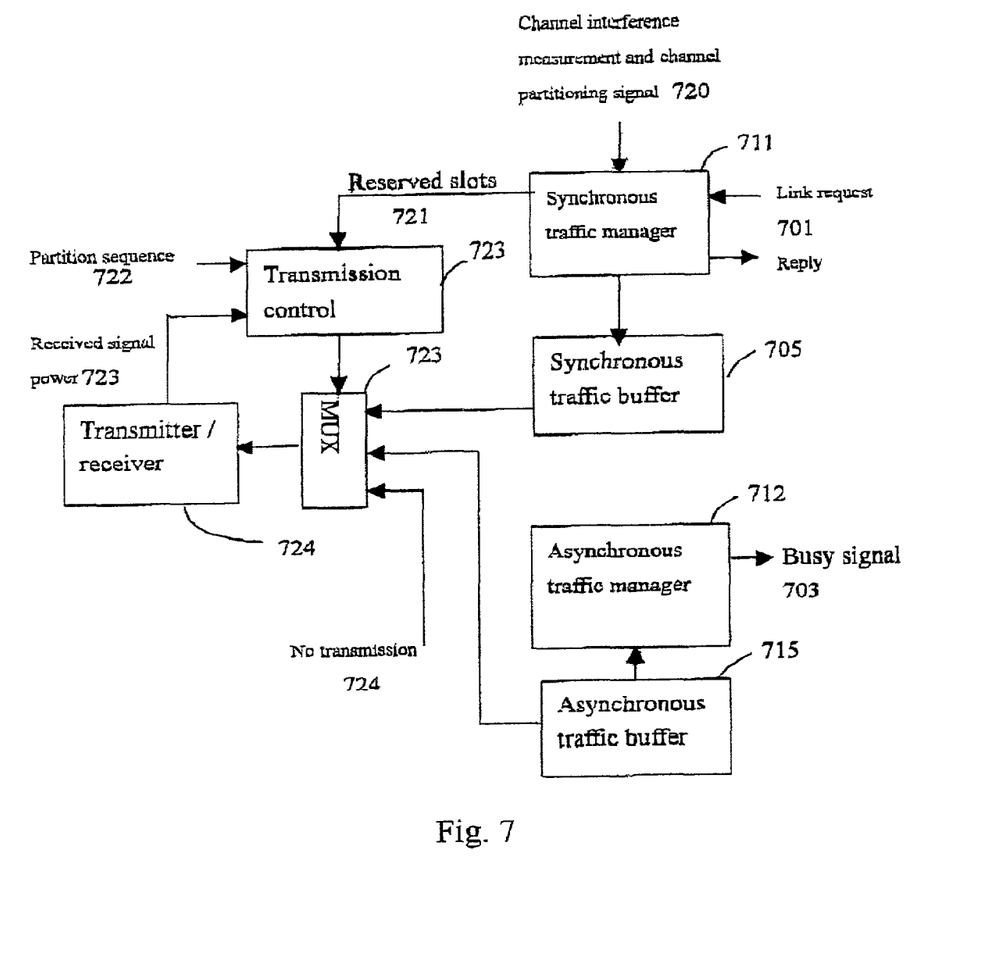
FIG. 7 is a system block diagram showing the traffic management according to the present invention.

Traffic Management. The partition sequence utilizes the good channels efficiently for given traffic, and the best it can do depends on the ratio of good channels to used channels. If the amount of input traffic is below a predetermined threshold, it can be fully protected from interference. There will be no performance degradation such as throughput or packet loss rate due to interference. There are two embodiments of traffic control according to the present invention, one is synchronous traffic management and the other is asynchronous traffic management. FIG. 7 is a schematic block diagram illustrating two traffic management embodiments according to the present invention.

Synchronous Traffic Management. Synchronous traffic is defined as link-based and reservation-based. Synchronous traffic manager 711 first receives a link request 701, and channel interference measurement and channel partitioning information 720 to form a link having predetermined traffic parameters. Upon acceptance of the link request 701, synchronous traffic manager 711 reserves a series of time slots for link request 701. Traffic manager 711 replies to the request, utilizing the following algorithm in one embodiment of the present invention:

Step 1: Obtain a good channel ratio $R_g$ as the ratio of the number of good channels to the number of used channels in the hopping sequence; a channel is good if its interference collision ratio is below a predetermined threshold of, for example, 0.1 or 0.2, which may be determined from an acceptable signal to noise ratio.

Step 2: Calculate the utilization ratio $T_n$ as the ratio of the number of request slots to the number of all transmission slots, for this new request; also calculate the utilization ratio $T_o$ as the sum of all existing reservations.

Step 3: Reject the request if the total utilization ratio including this new request exceeds the good channel ratio,; i.e., if $T_n+T_o>R_g$.

Asynchronous Traffic Management. In the asynchronous traffic management embodiment of the present invention, there is no reservation slot for asynchronous traffic. Asynchronous traffic manager 712 transmits a busy signal responsive to the state of asynchronous traffic buffer 715; that is, if the asynchronous traffic buffer 715 is full, a busy signal 713 is transmitted, and if the asynchronous traffic buffer 715 is not full, the busy signal 703 is cleared. If the resulting time slot has been reserved by synchronous traffic manager 711, a packet from asynchronous traffic buffer 715 is selected and transmitted to asynchronous traffic manager 712. If the time slot has not been reserved, and there some asynchronous packets to send, this embodiment of the present invention provides a first scheme as follows:

Scheme (1): If the current partition in the partition sequence is good, send the packet. If the partition is not good, do not send anything. Scheme (2): If the current partition in the partition sequence is good, send the packet. If the partition is not good, measure the received signal power before transmission. If the power is below a predetermined threshold, send the packet, otherwise do not send anything. A transmission control 723 receives reserved slots information 721 from the synchronous traffic manager 711, a partition sequence 722 from the partition sequence generator 317, a received signal power 723 from the transmitter/receiver 724 so as to output a hopping frequency to a multiplexer 723. Then the multiplexer 723 further receives signals from the synchronous traffic buffer 705 or asynchronous traffic buffer 715 so as to ouput multiplexed signals to the transmitter/receiver 724, or receives a no transmission signal 724 so as not to transmit any signal.

While the above is a full description of the specific embodiments, various modifications, alternative constructions and equivalents may be used. For example, although the examples shown were for Bluetooth, the concepts described in the present invention are suitable for any communications system implementable in a frequency hopping spread spectrum system. Further, any implementation technique, either analog or digital, numerical or hardware processor, can be advantageously utilized. Therefore, the above description and illustrations should not be taken as limiting the scope of the present invention which is defined by the appended claims.

We claim:

1. A selective hopping method for hit avoidance in a frequency hopping spread spectrum communication system utilizing an original hopping sequence, the communications system having a plurality of available channels for receiving signal packet traffic utilizing a plurality of receiving signal slots, the plurality of available channels all being available for use in frequency hopping, comprising the steps of;

(1.1) dividing the plurality of available channels into a plurality of partitions;

(1.2) determining a combination of said plurality of partitions in a predetermined distribution based on the number of channels in each of said plurality of partitions;

(1.3) forming a partition sequence by assigning each of said plurality of partitions into a plurality of preselected receiving signal slot sets based on said combination; and (1.4) generating a generated hopping sequence by partition mapping from the original hopping sequence, wherein said partition mapping is responsive to said partition sequence.

2. The method of claim 1, wherein said step (1.1) further comprises the steps of:

(2.1) defining a first interference collision ratio for a channel being a number of a measured interference divided by a number of received signal packets on the channel subtracting a number of unknown events, wherein an unknown event has a received signal power less than a first predetermined threshold;

(2.2) grouping said plurality of available channels having values of first interference collision ratio within a predetermined range into the same one of said plurality of partitions.

3. The method of claim 2, further comprising the step of determining errors in a received signal packet by an error detection method, wherein received signal packets having errors are designated as interference events, and received signal packets having no errors are designated as interference-free events.

4. The method of claim 3, wherein said step of determining errors in a received signal packet further comprises the step of determining whether the received signal packet is designated as an interference event if its received packet signal power is larger than said first predetermined threshold, and the received signal packet has an error being detected responsive to said error detecting method, whereby the received signal packet is designated as an interference-free event if the received packet signal power is larger than said first predetermined threshold and the received signal packet has no error being detected responsive to said error detecting method.

5. The method of claim 4, wherein said error detection method utilizes HEC.

6. The method of claim 4, wherein said error detection method utilizes CRC.

7. The method of claim 4, wherein said error detection method utilizes FEC.

8. The method of claim 4, wherein said error detection method utilizes a combination of HEC, CRC, and FEC.

9. The method of claim 4, further comprising the steps of:
(63.1) counting the number of interference events and the number of interference-free events for each of said plurality of partitions in a predetermined period of time; and
(63.2) calculating a second interference collision ratio for each of said plurality of channels as a ratio of the number of interference events to the sum of the number of interference events and the number of interference-free events.

10. The method of claim 2, wherein a step of determining interference in a received packet further comprises the steps of:
(15.1) measuring a signal strength in a channel silent time, said channel silent time being a predetermined interval having no transmission signals; and
(15.2) designating a received signal packet as an interference event if the signal power of the received signal packet in said channel silent time is larger than a second predetermined threshold; and designating the received packet of signals as an interference-free event if the signal power of the received packet of signals in said channel silent time is less than said second predetermined threshold.

11. The method of claim 10, further comprising the steps after step (15.2) of:
(16.1) counting the number of interference events and the number of interference-free events for each of said plurality of partitions in a predetermined period of time; and
(16.2) calculating a second interference collision ratio for each of said plurality of channels as a ratio of the number of interference events to the sum of the number of interference events and the number of interference-free events.

12. The method of claim 2, wherein said step (2.2) further comprises the steps of: selecting the smallest number from a predetermined set of integers indicating a limit to the number of available channels; selecting at least one channel from said plurality of available channels responsive to the lowest values of first interference collision ratios, whereby the number of said selected channels is equal to said selected smallest number; assigning an upper bound and a lower bound for the first interference collision ratio for each of said plurality of partitions; designating a channel from said at least one selected channel to a selected one of said plurality of partitions responsive to the first interference collision ratio of said channel being between said upper bound and said lower bound of said selected partition; removing partitions having no channels; and re-designating partitions to fill the hole generated by a removed partition; determining the total number of said plurality of partitions; and determining the members and size of each of said plurality of partitions.

13. The method of claim 2, wherein said step (2.2) further comprises the steps of:
(18.1) selecting a number of said plurality of available channels having a first interference collision ratio below a third predetermined threshold;
(18.2) selecting a number from a set of integers indicating the number of available channels, said selected number being the largest one in said set of integers, and said selected number further being smaller than the number of said channels of step (18.1);
(18.3) selecting a number being the smallest number of said set of integers responsive to no number being generated from said step (18.2);
(18.4) assigning an upper bound and a lower bound for the first interference collision ratio for each said plurality of partitions;
(18.5) designating a channel to one of said plurality of partitions as the first interference collision ratio of said channel having an interference ratio being between said upper bound and said lower bound of said one of said plurality of partitions;
(18.6) removing partitions having no channel; and re-designating partitions to fill the hole generated by a removed partition; and
(18.7) determining the total number of said plurality of partitions, and the numbers and size of each of said plurality of partitions.

14. The method of claim 1, wherein said step (1.2) further comprises the steps of:
(3.1) dividing said predetermined distribution into a plurality of superframes;
(3.2) dividing each of said plurality of superframes into a plurality of frames;
(3.3) dividing each of said plurality of frames into a plurality of MAUs, each of said plurality of frames including a predetermined number of said plurality of MAUs, and said plurality of superframes including a predetermined number of said plurality of frames;
(3.4) determining the number of MAUs for each of said partitions; and
(3.5) distributing said MAUs of each of said partitions into a selected plurality of said frames.

15. The method of claim 14, wherein said step (1.3) comprises assigning a first kind of priority to said plurality of selected receiving signal slot sets, and assigning a second kind of priority to said plurality of partitions.

16. The method of claim 15, further comprising the steps of designating a predetermined number of said plurality of MAUs of each of said plurality of partitions to said selected receiving signal slot sets such that a receiving signal slot having a higher value of said first kind of priority is designated by a MAU of partition having a higher value of said second kind of priority.

17. The method of claim 14, wherein said step (3.5) further comprises the steps of:
(6.1) distributing a predetermined number of said plurality of MAUs in one of said plurality of partitions uniformly into all of said plurality of frames; and
(6.2) distributing a plurality of residue MAUs, said residue MAUs being a plurality of said plurality of MAUs not having been distributed in said step (6.1).

18. The method of claim 17, wherein said step (6.2) further comprises the steps of distributing said residue MAUs evenly across a plurality of said plurality of frames MAUs.

19. The method of claim 18, further comprising the steps of:
(8.1) determining a minimum spacing for distribution of said plurality of residue MAUs;
(8.2) distributing said residue MAUs into said plurality of frames spaced equally with said minimal spacing; and
(8.3) distributing a plurality of said residue MAUs having not been distributed in said step (8.2) into a plurality of said frames having not been distributed in said step (8.2).

20. The method of claim 1, wherein said generated hopping sequence is utilized responsive to predetermined communication system parameters.

21. The method of claim 20, wherein said generated hopping sequence and said original hopping sequence coexist in a pico-net having a master unit selecting between said generated hopping sequence and said original hopping sequence responsive to a target communicable therewith, and a database for storing said targets that should be communicated with generated hopping sequence, thereby providing backward compatibility.

22. The method of claim 1, wherein in said step (1.4) further comprises a step of selecting one of said plurality of available channels from one of said plurality of partitions by utilizing a probability distribution whereby each of said plurality of channels have equal probability of selection.

23. The method of claim 22, wherein said probability distribution is a discrete statistically uniform distribution mapping from all of the available channels in each of said plurality of partitions into said generated hopping sequence.

24. The method of claim 23, wherein a pseudo-random mapping is utilized, further comprises the steps of:
  (24.1) obtaining a sum value by adding a selected one of a plurality of shifter signals to a first channel number selected by said original hopping sequence, wherein each of the plurality of shifter signals is uniformly distributed within the number of channels of a corresponding one of said plurality of partitions;
  (24.2) obtaining a modulus value wherein the modulus value is the remainder of dividing said sum value by a number of channels of a selected one of plurality of partitions;
  (24.3) obtaining a second channel number for said generated hopping sequence by looking-up a selected one of a plurality of tables wherein said modulus value is used as a index value for the selected table, wherein each of the plurality of tables is composed of said channels of a corresponding one of said plurality of partitions.

25. The method of claim 23, wherein an available channel of the original hopping sequence being in said partition selected by the partition sequence remains unchanged, thereby maintaining the similarity between the original hopping sequence and said generated hopping sequence.

26. The method of claim 23, wherein a plurality of shifter signals are uniformly distributed over a predetermined number of channels in a selected one of said plurality of partitions.

27. The method of claim 22, wherein said probability distribution is a discrete deterministically uniform distribution mapping from all of the available channels in each of said plurality of partitions into said generated hopping sequence.

28. The method of claim 1, wherein after said step (1.4), further comprising a step of managing the receiving signal packet traffic whereby a receiving signal packet is transmitted only in said selected receiving signal slot sets.

29. The method of claim 28, wherein said step of managing utilizes a synchronous traffic management.

30. The method of claim 29, wherein the communications system includes a plurality of request slots, a plurality of transmission slots, and a plurality of reservation slots, said synchronous traffic management comprising the steps of:
  calculating the ratio of a number of good channels from a plurality of available channels to the number of the plurality of available channels in said generated hopping sequence, thereby determining a good channel ratio, a channel being designated good if it has a third interference collision ratio below a fourth predetermined threshold, wherein the third interference collision ratio is defined as a number of channels having measured interference divided by a number of all received signal packets subtracting a number of unknown events, wherein an unknown event has a received signal power less than a first predetermined threshold;
  calculating a first utilization ratio as a ratio of the number of request slots to the number of all transmission slots;
  calculating a second utilization ratio as the ratio of-the number of the sum of all existent reservation slots to the number of all transmission slots; and
  rejecting a request if the sum of said first and said second utilization ratios exceeds said good channel ratio.

31. The method of claim 29, wherein the communications system further includes a synchronous traffic buffer and a plurality of time slots, the method further comprising the step of selecting and transmitting a signal packet from the synchronous traffic buffer responsive to a synchronous traffic management reservation time slot status.

32. The method of claim 28, wherein said step of managing utilizes an asynchronous traffic management.

33. The method of claim 32, wherein said asynchronous traffic management comprises the step of transmitting received signal packets only via good channels.

34. The method of claim 32, further comprising the step of selecting an asynchronous signal packet for transmission responsive to the reservation status of the time slot and a list of said good channels.

35. The method of claim 32, further comprising the step of selecting an asynchronous received signal packet for transmission responsive to the reservation status of a time slot, a list of a plurality of good channels, and the received signal power of the received signal packet.

36. The method of claim 1, wherein the frequency hopping spread spectrum communication system is a Bluetooth communication system.

37. A selective hopping system for hit avoidance in a frequency hopping spread spectrum communication system utilizing an original hopping sequence, having a plurality of available channels for receiving signal packet traffic utilizing a plurality of receiving signal slots, the plurality of available channels all being available for use in frequency hopping, comprising:
  partition generating means for dividing the plurality of available channels into a plurality of partitions;
  partition distributing means coupled to said partition generating means for determining a combination of said plurality of partitions in a predetermined distribution based on the number of channels in each of said plurality of partitions;
  partition sequence generating means coupled to said partition distribution means for forming a partition sequence by assigning each of said plurality of partitions into a plurality of preselected receiving signal slot sets based on said combination; and
  generated hopping sequence means, coupled to said partition sequence generating means, for partition mapping from the original hopping sequence, wherein said partition mapping is responsive to said partition sequence.

38. The selective hopping system of claim 37, wherein said partition generating means further defines a first interference collision ratio being a number measured interference divided by a number of selected received signal packets subtracting a number of unknown events, wherein an unknown event has a received signal power less than a first predetermined threshold; and grouping said plurality of available channels having values of the first interference collision ratio within a predetermined range into the same one of said plurality of partitions.

39. The selective hopping system of claim 38, further comprising an error determining means for determining errors in a received signal packet by an error detection method, whereby the received signal packet is designated as an interference event if its received packet signal power is larger than said first predetermined threshold and the received signal packet has an error being detected responsive to said error detecting method, whereby the received signal packet is designated as an interference-free event if the received packet signal power is larger than said first predetermined threshold and the received signal packet has no error being detected responsive to said error detecting method.

40. The selective hopping system of claim 39, wherein said error detection method utilizes HEC.

41. The selective hopping system of claim 39, wherein said error detection method utilizes CRC.

42. The selective hopping system of claim 39, wherein said error detection method utilizes FEC.

43. The selective hopping system of claim 38, wherein said error detection method utilizes a combination of HEC, CRC, and FEC.

44. The selective hopping system of claim 38, wherein the error determining means determines an error based on the signal strength of said received signal packet in a channel silent time, wherein said channel silent time is a predetermined interval having no transmission signals; and designates a received signal packet as an interference event if the signal power of the received signal packet in said channel silent time is larger than a second predetermined threshold; and designates the received signal packet as an interference-free event if the signal power of the received packet of signals in said channel silent time is less than a second predetermined threshold.

45. The selective hopping system of claim 39 or 44, further comprising:
counting means for counting the number of interference events and the number of interference-free events for each of said plurality of partitions in a predetermined period of time; and
first calculating means coupled to said counting means for calculating a second interference collision ratio for each of said plurality of channels as a ratio of the number of interference events to the sum of the number of interference events and the number of interference-free events.

46. The selective hopping system of claim 44, wherein channels having a second interference collision ratio within a predetermined range is classified to a same partition.

47. The selective hopping system of claim 37, wherein said partition distributing means further comprises:
dividing means for dividing said predetermined distribution into a plurality of superframes;
then dividing each of said plurality of superframes into a plurality of frames; and
dividing each of said plurality of frames into a plurality of MAUs, each of said plurality of frames including a predetermined number of said plurality of MAUs, and said plurality of superframes including a predetermined number of said plurality of frames; and
designating a predetermined number of said plurality of MAUs to be distributed into each of said partitions;

determining means coupled to said dividing means for determining the number of MAUs for each of said partitions; and
distributing means for coupling said determining means for distributing said MAUs of each of said partitions into a selected plurality of said frames.

48. The selective hopping system of claim 47, wherein said partition sequence generating means define a first kind of priority to said plurality of selected receiving signal slot sets, and define a second kind of priority to said plurality of partitions.

49. The selective hopping system of claim 48, wherein after defining a priority, said partition sequence generating means further designates a predetermined number of said plurality of MAUs of each of said plurality of partitions to said selected receiving signal slot sets such that a receiving signal slot having a higher value of said first kind of priority is designated by a MAU of partition having a higher value of said second kind of priority.

50. The selective hopping system of claim 47, wherein said distributing means distributes a predetermined number of said plurality of MAUs in one of said plurality of partitions in an approximately uniform way.

51. The selective hopping system of claim 37, wherein said generated hopping sequence means further comprises a means for selecting one of said plurality of available channels from one of said plurality of partitions by utilizing a probability distribution whereby each of said plurality of channels have equal probability of selection.

52. The selective hopping system of claim 37, further comprising a traffic management means coupled to said generated hopping sequence means for managing the receiving signal packet traffic, whereby the receiving signal traffic is transmitted in said selected receiving signal slot sets.

53. The selective hopping system of claim 52, wherein said traffic management means utilizes a synchronous traffic management.

54. The selective hopping system of claim 53, wherein the communications system includes a plurality of request slots, a plurality of transmission slots, and a plurality of reservation slots, said traffic management means comprises:
second calculating means for calculating the ratio of a number of good channels from a plurality of available channels to a number of a plurality of available channels in said generated hopping sequence, thereby determining a good channel ratio, a channel being designated good if it has a third interference collision ratio below a fourth predetermined threshold;
third calculating means for calculating a first utilization ratio as a ratio of the number of request slots to the number of all transmission slots;
fourth calculating means for calculating a second utilization ratio as the ratio of the number of the sum of all existent reservation slots to the number of all transmission slots; and
rejecting means coupled to said second, third and fourth calculating means for rejecting a request if the sum of said first and said second utilization ratios exceeds said good channel ratio.

55. The selective hopping system of claim 53, wherein the communications system further includes a synchronous traffic buffer and a plurality of time slots, the traffic management means further selects and transmits a signal packet from the synchronous traffic buffer responsive to a synchronous traffic management reservation time slot status.

56. The selective hopping system of claim 53, wherein said traffic management means utilizes an asynchronous traffic management.

57. The selective hopping system of claim 56, wherein said asynchronous traffic management transmits received signal packets only via good channels.

58. The selective hopping system of claim 56, wherein said traffic management means selects an asynchronous signal packet for transmission responsive to a reservation status of a time slot and a list of said good channels.

59. The selective hopping system of claim 37, wherein the frequency hopping spread spectrum communication system is a Bluetooth communication system.

60. A selective hopping system for hit avoidance in a frequency hopping spread spectrum communication system utilizing an original hopping sequence, having a plurality of available channels for receiving signal traffic with a plurality of receiving signal slots, the plurality of available channels all being available for use in frequency hopping, comprising:
- a hopping sequence generator having an input from a hop clock;
- a partition sequence change processor for providing a process for changing a partition sequence;
- a partition sequence generator having inputs from said hop clock, a traffic requirement, and a channel partitioning circuit, and said partition sequence generator generating said partition sequence;
- an original/mapped sequence selector having an input from said partition sequence change processor for selecting a hopping sequence;
- a partition mapper having inputs from said hopping sequence generator and said partition sequence generator; and
- said partition mapper serving to map said partition sequence into a generated hopping sequence;
- a multiplexer receiving the signals from said hopping sequence generator, said partition mapper and said original/mapped sequence selector for multiplexing said input signal;
- a frequency synthesizer receiving an output from said multiplex and outputting a continuous sinusoidal signal with a frequency being determined by the current channel number from the hopping sequence;
- a mixer receiving an RF input signal and mixing said RF input signal with the signals from said frequency synthesizer, wherein a mixed signal is converted to a lower and fixed intermediate frequency signal;
- a channel quality/interference level measurement circuit for measuring channel qualities and interference levels; and
- a channel partitioner for receiving inputs from said channel quality/interference level measurement circuit and then dividing said available channels into various partitions which are provide to the partition sequence generator.

61. The selective hopping system of claim 60, wherein said channel partitioner divides the plurality of available channels into a plurality of partitions.

62. The selective hopping system of claim 60, wherein said partition sequence generator distributing the available channels in each of said plurality of partitions into a predetermined distribution; and forming a partition sequence by assigning a predetermined number of channel to a plurality of selected receiving signal slot sets.

63. The selective hopping system of claim 60, wherein hopping sequence generator generates a generated hopping sequence by partition mapping from the original hopping sequence, wherein said partition mapping is responsive to said partition sequence.

* * * * *